United States Patent
Kegasawa

(10) Patent No.: US 8,446,418 B2
(45) Date of Patent: May 21, 2013

(54) IMAGE PROCESSING APPARATUS AND IMAGE PROCESSING METHOD

(75) Inventor: Kazuyoshi Kegasawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 319 days.

(21) Appl. No.: 12/902,644

(22) Filed: Oct. 12, 2010

(65) Prior Publication Data

US 2011/0122143 A1    May 26, 2011

(30) Foreign Application Priority Data

Nov. 20, 2009  (JP) ................................ 2009-264631

(51) Int. Cl.
*G06F 15/80*    (2006.01)

(52) U.S. Cl.
USPC ............................ 345/505; 345/502; 345/537

(58) Field of Classification Search
None
See application file for complete search history.

(56) References Cited

U.S. PATENT DOCUMENTS 6,731,338 B1 *   5/2004   Lin ................................ 348/323

FOREIGN PATENT DOCUMENTS

JP        A-2006-5524        1/2006

* cited by examiner

*Primary Examiner* — Hau Nguyen
*Assistant Examiner* — Ryan M Gray
(74) *Attorney, Agent, or Firm* — Oliff & Berridge, PLC

(57) ABSTRACT

An image processing apparatus includes: a plurality of image processing units each of which is disposed so as to correspond to each of partial images and processes data of each of pixels composing the partial image with reference to data of peripheral pixels of the pixel, wherein the plurality of image processing units includes at least a first image processing unit which use data of pixels composing other partial images adjacent to a first partial image as the data of the peripheral pixels for the image processing on a first partial image, and a second image processing unit which performs the image processing on a second partial image and brokers data of pixels treated as the peripheral pixels by the first image processing unit from an image processing unit which processes the other partial image to the first image processing unit.

8 Claims, 13 Drawing Sheets

IMAGE PROCESSING APPARATUS AND IMAGE PROCESSING METHOD

INCORPORATION BY REFERENCE

This application claims priority to Japanese Patent Application No. 2009-264631 filed on Nov. 20, 2009, in Japan, which is herein incorporated by reference in its entirety.

BACKGROUND

1. Technical Field

The present invention relates to an image processing technique.

2. Related Art

In recent years, the realization of high-resolution images to be input to video display equipment such as projectors, liquid crystal televisions, or plasma televisions has been advanced. In such equipment, for completing image processing on numerous pixels composing a screen image in a short time, a method is sometimes employed in which input image data is divided into a plurality of partial image data and processed in parallel. When processing is applied using a plurality of image processing sections to the data which is divided into the plurality of partial image data and input thereto, each of the image processing sections performs a so-called filtering process in which each of the image processing sections refers to pixel data in a peripheral region (hereinafter also referred to as peripheral pixel data) of the divided partial image data. An example of techniques of performing the filtering process with reference to peripheral pixel data is disclosed in, for example, JP-A-2006-5524.

As a method for directly exchanging peripheral pixel data among the image processing sections, the following method has been employed: each of the image processing sections is connected to a plurality of image processing sections which take charge of processing adjacent partial image data, with respective lines for peripheral pixel data exchange; and the image processing section directly communicates with each of the others to exchange the peripheral pixel data. In the method, each image processing section needs to communicate with a maximum of eight other image processing sections therearound. Specifically, the image processing section needs to exchange peripheral pixel data with image processing sections which take charge of processing adjacent partial image data in up, down, left, right, obliquely upper right, obliquely upper left, obliquely lower left, and obliquely lower right directions with one partial image as the center, i.e., eight image processing sections in total. Accordingly, the numbers of transceivers, wirings, pins of devices, and the like are increased.

SUMMARY

An advantage of some aspects of the invention is to solve at least a part of the problem described above, and the invention can be embodied as the following embodiments or application examples.

FIRST APPLICATION EXAMPLE

A first application example is directed to an image processing apparatus which processes image data representing an image composed of a plurality of pixels including: a plurality of image processing units each of which is disposed so as to correspond to each of partial images obtained by dividing a display image corresponding to the image data and processes data of each of pixels composing the partial image with reference to data of peripheral pixels of the pixel, image data corresponding to the partial image is input to the plurality of image processing units; and an image output unit which outputs display image data using data of pixels on which the image processing has been performed by the image processing units, wherein the plurality of image processing units include at least a first image processing unit which acquires, when performing the image processing on a first partial image, at least data of pixels in a region adjacent to the first partial image, among pixels composing other partial images adjacent to the first partial image, to use the data for the image processing as the data of the peripheral pixels, and a second image processing unit which performs the image processing on a second partial image different from the first partial image and brokers at least part of data of pixels treated as the peripheral pixels by the first image processing unit from an image processing unit which processes a partial image adjacent to the partial image treated by the first image processing unit to the first image processing unit.

According to this image processing apparatus, since the second image processing unit brokers peripheral pixel data of another partial image which is adjacent to the first partial image and to which the first image processing unit refers, the first image processing unit can acquire the peripheral pixel data without directly acquiring from another adjacent partial image.

SECOND APPLICATION EXAMPLE

A second application example is directed to the image processing apparatus according to the first application example, wherein the second image processing unit brokers, together with acquisition of peripheral pixel data necessary for the second image processing unit for the reference, the peripheral pixel data necessary for the first image processing unit for the reference.

According to this image processing apparatus, since the second image processing unit brokers, together with the acquisition of peripheral pixel data, the peripheral pixel data to which the first image processing unit refers, the process of the acquisition and brokering can be performed at high speed compared to the case where the acquisition and brokering are separately performed.

THIRD APPLICATION EXAMPLE

A third application example is directed to the image processing apparatus according to the second application example, wherein each of the partial images is an image obtained by two-dimensionally dividing the display image corresponding to the image data in a horizontal direction and a vertical direction, and when the first image processing unit refers to peripheral pixel data of a diagonally adjacent partial image adjacent to the first partial image in a diagonal direction, the second partial image is positioned adjacent to one of the first partial image and the diagonally adjacent partial image in the horizontal direction and the other in the vertical direction, and the second image processing unit brokers peripheral pixel data of the diagonally adjacent partial image necessary for the first image processing unit for the reference.

According to this image processing apparatus, compared to the case where image processing units adjacent to each other in the diagonal direction directly exchange peripheral pixel data, a path via which the image processing units acquire and broker peripheral pixel data can be structurally simplified.

FOURTH APPLICATION EXAMPLE

A fourth application example is directed to the image processing apparatus according to the third application example, wherein the image processing units exchange the peripheral pixel data at two time-divided timings, at the first timing of the two timings, each of the image processing units exchanges the peripheral pixel data with the image processing unit adjacent thereto in one of the horizontal direction and the vertical direction, and at the second timing of the two timings, each of the image processing units exchanges the peripheral pixel data with the image processing unit adjacent thereto in the other of the horizontal direction and the vertical direction.

According to this image processing apparatus, the number of timings at which all the image processing units exchange peripheral pixel data necessary for processing can be minimized.

FIFTH APPLICATION EXAMPLE

A fifth application example is directed to the image processing apparatus according to the first application example, wherein the plurality of image processing units include zero or two image processing units each of which acquires, from an odd number of image processing units of a plurality of other image processing units respectively corresponding to partial images adjacent to a corresponding partial image, part of data of pixels in a region adjacent to the corresponding partial image as the peripheral pixel data for the reference, and a data communication path configured of the image processing units and data acquiring paths each of which is a path via which the image processing units directly acquires the peripheral pixel data from each other and passing through all the image processing units once is formed by connecting the image processing units to one another with the data acquiring paths.

According to this image processing apparatus, the data communication path has a path configuration of a so-called "single stroke" in which the path passes through all the image processing units. Accordingly, when the path configuration is of a single stroke in which a starting point and an end point of the data communication path are different, it is possible to configure a data acquiring path via which each of the image processing units can acquire peripheral pixel data necessary for processing only by mutually and directly performing acquisition of peripheral pixel data with a maximum of two adjacent image processing units. When the path configuration is of a single stroke in which the starting point and the end point of the data communication path are the same, that is, a closed path, the path has a loop shape. When the path configuration is configured as the shortest path, a process of acquiring peripheral pixel data only from one adjacent image processing unit is repeated, so that each of the image processing units can acquire the peripheral pixel data necessary for processing.

SIXTH APPLICATION EXAMPLE

A sixth application example is directed to the image processing apparatus according to any of the first to fifth application examples, further including: an image data input section which inputs the image data; and an image dividing section which two-dimensionally divides the display image corresponding to the image data to obtain the plurality of partial images and inputs each of the partial images to each of the image processing units.

According to this image processing apparatus, since the image dividing section is included, image data corresponding to a display image is directly input to the image processing apparatus; the image data is divided into partial images by the image dividing section; and the partial images are processed by the image processing units.

SEVENTH APPLICATION EXAMPLE

A seventh application example is directed to the image processing apparatus according to any of the first to sixth application examples, further including a timing control section which controls a plurality of time-divided timings at which the image processing units exchange the peripheral pixel data.

According to this image processing apparatus, since the timing control section is included, the timing for acquiring peripheral pixel data can be controlled without externally providing a controller which controls the timing for acquiring peripheral pixel data or without inputting control signals for controlling the timing.

EIGHTH APPLICATION EXAMPLE

An eighth application example is directed to an image processing method for processing image data representing an image composed of a plurality of pixels by using a plurality of image processing units each of which is disposed so as to correspond to each of partial images obtained by dividing a display image corresponding to the image data, inputs image data corresponding to the partial image, and processes data of each of pixels composing the partial image with reference to data of peripheral pixels of the pixel, image data corresponding to the partial image is input to the plurality of image processing units, including: by using a first image processing unit of the plurality of image processing units, acquiring, when performing the image processing on a first partial image, at least data of pixels in a region adjacent to the first partial image, among pixels composing other partial images adjacent to the first partial image, to use the data for the image processing as the data of the peripheral pixels; by using a second image processing unit, performing the image processing on a second partial image different from the first partial image and brokering at least part of data of pixels treated as the peripheral pixels by the first image processing unit from an image processing unit which processes a partial image adjacent to the partial image treated by the first image processing unit to the first image processing unit; and outputting display image data using data of pixels on which the image processing has been performed by the plurality of image processing units.

According to this image processing method, since the second image processing unit brokers peripheral pixel data of another partial image which is adjacent to the first partial image and to which the first image processing unit refers, the first image processing unit can acquire the peripheral pixel data without directly acquiring from the another adjacent partial image.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
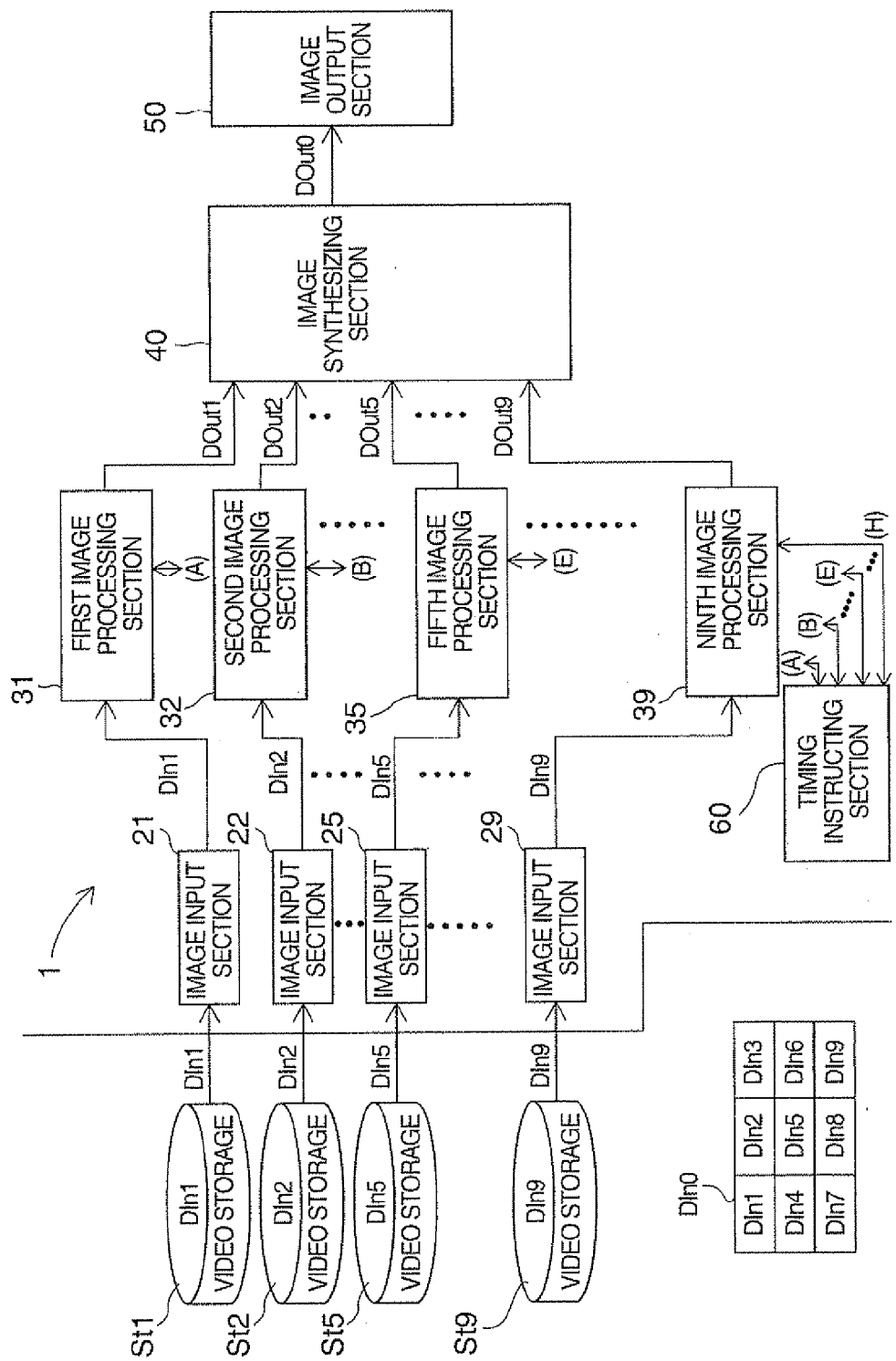
FIG. 1 is a block diagram showing a configuration of an image processing apparatus as a first embodiment.

Embodiments of the invention will be described.
A. First Embodiment
A1 Configuration of Image Processing Apparatus In a first embodiment, an image processing apparatus mounted on a high-resolution liquid crystal projector will be described as an example. FIG. 1 is a block diagram showing a configuration of an image processing apparatus 1 mounted on the liquid crystal projector, as the first embodiment of the invention. The liquid crystal projector is externally connected to video storages St1 to St9, and image data is input via image input sections 21 to 29 included in the image processing apparatus 1. As shown in FIG. 1, image blocks DIn1 to DIn9 each of which is a partial image obtained by dividing DIn0 as image data of one screen into 3×3 (9 in total) are respectively stored in the video storages St1 to St9. The image blocks DIn1 to DIn9 are respectively input from the video storages St1 to St9 to the image input sections 21 to 29 included in the image processing apparatus 1. The image blocks DIn1 to DIn9 are input as digital data from the respective video storages St1 to St9 to the image processing apparatus 1. The video storages St1 to St9 are each included in a computer in a PC cluster composed of a plurality of computers.

The image processing apparatus 1 includes the image input sections 21 to 29 described above, first to ninth image processing sections 31 to 39 which are nine image processing sections processing the image blocks DIn1 to 9 in parallel, an image synthesizing section 40 which synthesizes image data DOut1 to 9 corresponding to the respective image blocks processed in parallel in the image processing sections into image data of one screen, an image output section 50 which outputs synthesized image data DOut0 as an output signal to a liquid-crystal-panel driving section of a not-shown liquid crystal projector, and a timing instructing section 60.

In the image processing sections 31 to 39, the first image processing section 31 processes DIn1; the second image processing section 32 processes DIn2; and so on. In this manner, the image processing section number is associated with the image block number, and the image blocks DIn1 to 9 are processed. Hereinafter, a configuration of the fifth image processing section 35 will be mainly described.

Figure 2:
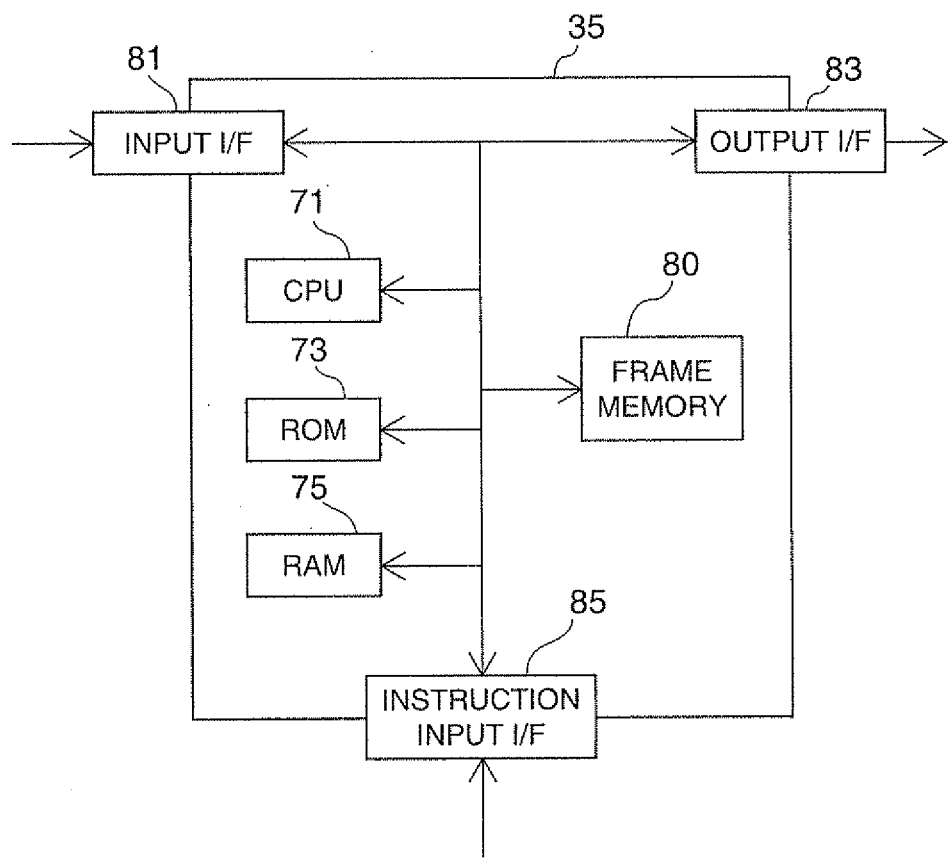
FIG. 2 is a block diagram showing an internal configuration of a fifth image processing section.

FIG. 2 is a block diagram showing an internal configuration of the fifth image processing section 35. The fifth image processing section 35 includes a CPU 71 which has a function as a digital signal processor (DSP), a ROM 73 which stores an operation program and the like, a RAM 75 which is used as a work area, a frame memory 80 which has a storage capacity slightly larger than image data obtained by dividing the image data DIn0, that is, the image block DIn5, an input interface 81 which receives the image block DIn5 from the video storage St5, an output interface 83 which outputs the image data DOut5 to the image synthesizing section 40, and an instruction input interface 85 which receives timing signals from the timing instructing section 60. The CPU 71, which controls the overall operation of the fifth image processing section 35, is a dedicated processor which can especially provide fast access to the frame memory 80 to perform predetermined image processing (filtering process). The function of the CPU 71 may be realized by using a field programmable array (FPGA), an image processing-dedicated LSI, or the like.

Figure 3:
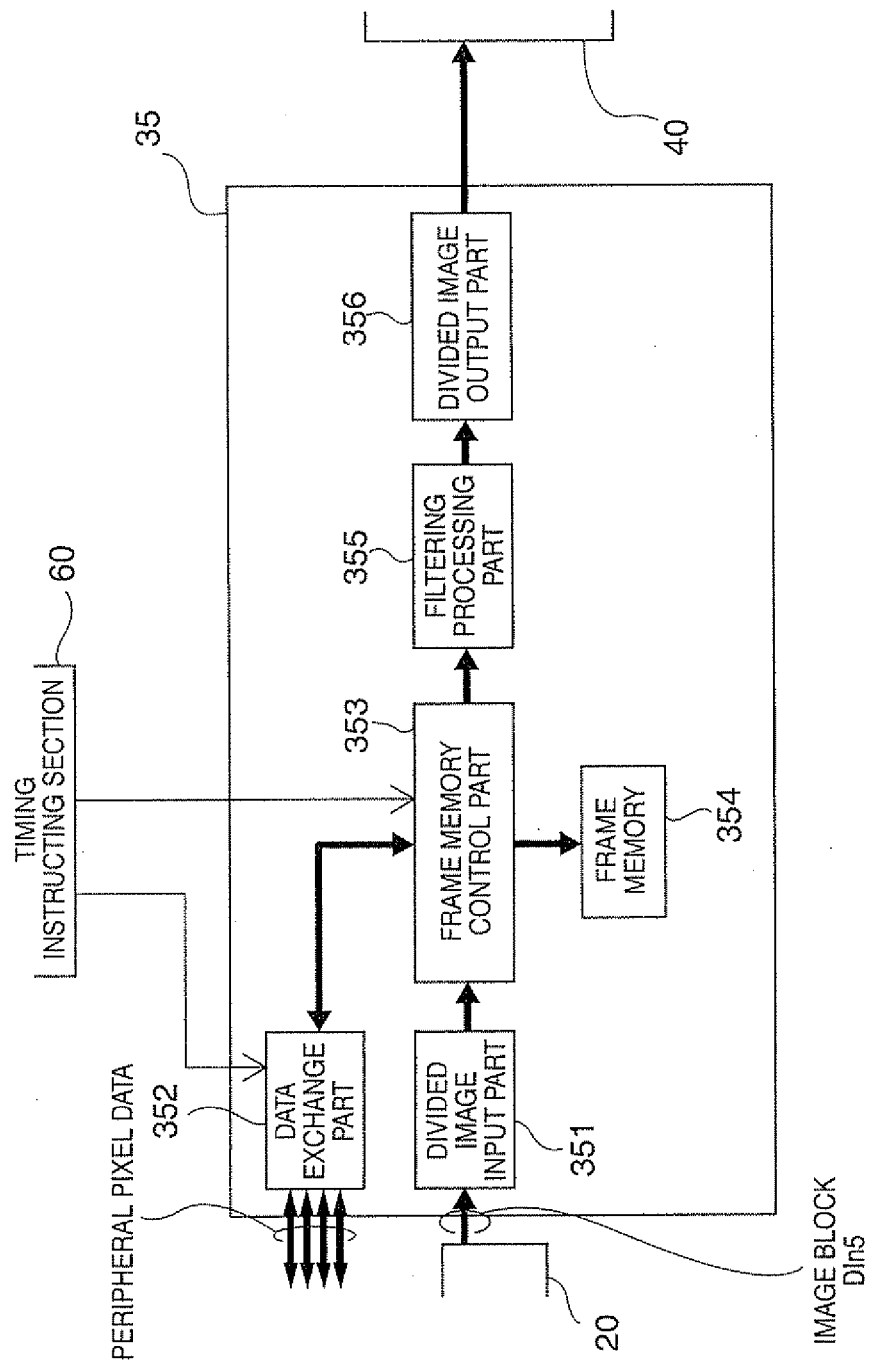
FIG. 3 is a block diagram schematically showing processing in the fifth image processing section.

Next, the functional configuration of each of the image processing sections will be described. FIG. 3 is a block diagram schematically showing processing in the fifth image processing section 35. The fifth image processing section 35 functionally includes a divided image input part 351, a data exchange part 352, a frame memory control part 353, a frame memory 354, a filtering processing part 355, and a divided image output part 356. The operation of each of the blocks is actually realized by executing predetermined programs by the CPU 71. These functional blocks will be described in detail later.

A2 Image Processing

Figure 4:
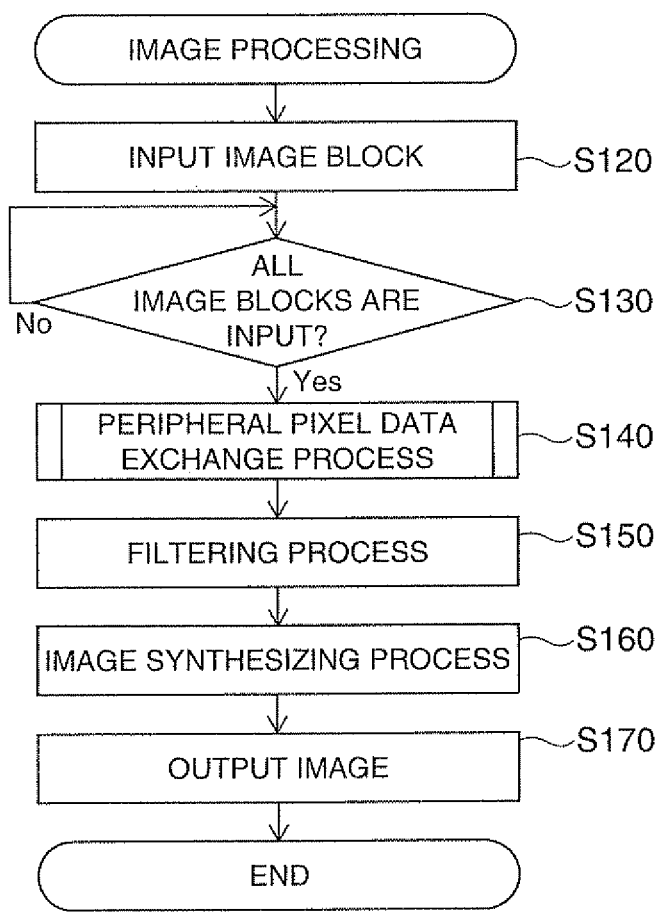
FIG. 4 is a flowchart showing the flow of image processing in the image processing apparatus.

Next, image processing performed by the image processing apparatus 1 will be described. FIG. 4 is a flowchart showing the flow of the image processing in the image processing apparatus 1. The image processing starts when the image blocks DIn1 to DIn9 are input from the video storages St1 to St9 (refer to FIG. 1) to the image input sections 21 to 29.

The image blocks DIn1 to 9 are respectively input from the image input sections 21 to 29 to the image processing sections 31 to 39 via the divided image input parts 351 to 391 (refer to FIG. 3) (Step S120). The frame memory control part of each of the image processing sections stores the input image block DIn in the frame memory. When the storing of the image block DIn to the frame memory is completed, the frame memory control part notifies the timing instructing section 60 of the fact. The timing instructing section 60 analyzes the accumulation status of the image block DIn in each of the image processing sections 31 to 39. When determining that input of all the image blocks DIn1 to 9 to the respective image processing sections is completed (Step S130: Yes), the timing instructing section 60 instructs the data exchange part of each of the image processing sections to start data exchange. When receiving the instruction of data exchange start from the timing instructing section 60, each of the data exchange parts performs a peripheral pixel data exchange process in which each of the data exchange parts exchanges peripheral pixel data necessary for processing an image block which the image processing section takes charge of processing with a data exchange part of a predetermined image processing section (Step S140). The peripheral pixel data exchange process will be described in detail later. In view of the fact that reception of image data is sequentially performed, data exchange may be instructed sequentially from the data exchange between image processing sections which can exchange data. In the embodiment, however, it is assumed for facilitating understanding the invention that data exchange is performed after all the first to ninth image processing sections 31 to 39 receive image data as shown in Step S130.

When the data exchange parts of the image processing sections complete the exchange of peripheral pixel data, each of the frame memory control parts outputs the image block DIn stored in the frame memory and the peripheral pixel data acquired through the peripheral pixel data exchange process to the filtering processing part, and the filtering processing part uses the two data to perform a filtering process (Step S150). After finishing the filtering process, each of the filtering processing parts outputs the processed data to the image synthesizing section 40 via the divided image output section. The image synthesizing section 40 synthesizes the image data DOut1 to 9 received from the respective divided image output sections (Step S160) and outputs the synthesized data as the image data DOut0 to the image output section 50. The image output section 50 outputs the input image data DOut0 to the liquid-crystal-panel driving section as an output signal (Step S170). By repetitively performing such image processing on the input image blocks DIn1 to 9, the image processing apparatus 1 performs image processing.

A3 Peripheral Pixel Data Exchange Process

Figure 5:
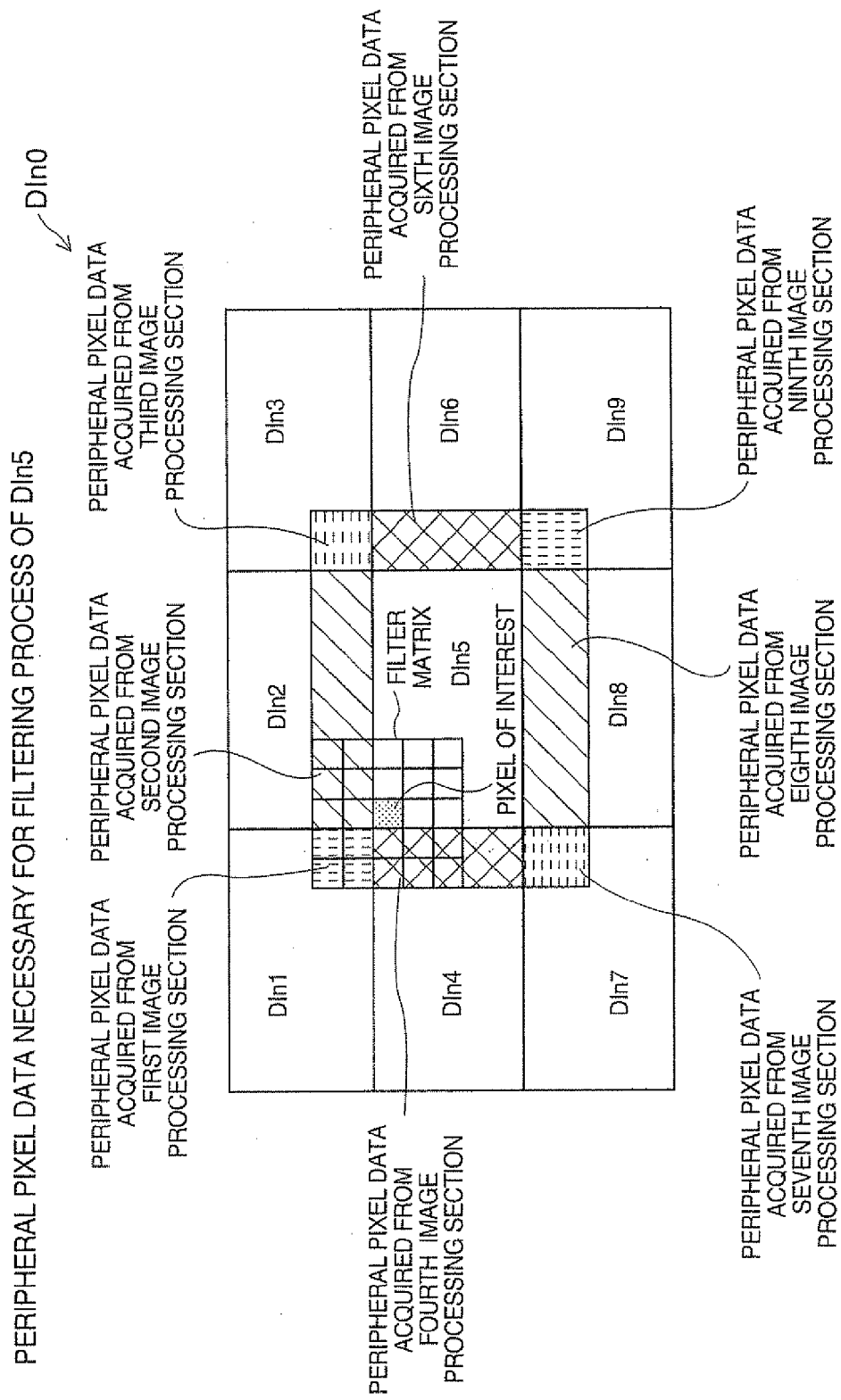
FIG. 5 is an explanatory diagram illustrating peripheral pixel data necessary for the fifth image processing section.

Next, the peripheral pixel data exchange process (refer to FIG. 4: Step S140) described above will be described. First, peripheral pixel data will be described. FIG. 5 is an explanatory diagram illustrating, as a specific example, peripheral pixel data necessary for the fifth image processing section 35 to perform the filtering process on the image block DIn5. The filtering processing part 355 uses a filter matrix of 5 rows×5 columns with a pixel to be processed (hereinafter also referred to as a pixel of interest) as the center in the image block DIn5 to perform the filtering process on the pixel of interest with reference to pixel data of every two pixels around the pixel of interest. Specifically, the filtering process is performed with a Laplacian filter or median filter for edge enhancement or noise reduction and other image processing filters such as a Kalman filter. In the case of performing such a filtering process, when pixels of every two pixels inside upper and lower sides in a vertical direction of the image block DIn5 and right and left sides in a horizontal direction, i.e., four sides in total (upper, lower, left, and right sides), are each a target to be processed as the pixel of interest, pixels to be referred to for the filtering process range to pixels included in the image blocks DIn1 to 4 and 6 to 9 which are image blocks around the image block DIn5. Accordingly, the fifth image processing section 35 needs to acquire peripheral pixel data shown in FIG. 5 as peripheral pixel data from the image blocks DIn1 to 4 and to 9 around the image block DIn5. The data exchange part 352 of the fifth image processing section 35 acquires these peripheral pixel data through the peripheral pixel data exchange process (refer to FIG. 4: Step S140). Hereinafter, up and down directions in the vertical direction are also referred simply to as "vertically", and left and right directions in the horizontal direction are also referred simply to as "horizontally".

Figure 6:
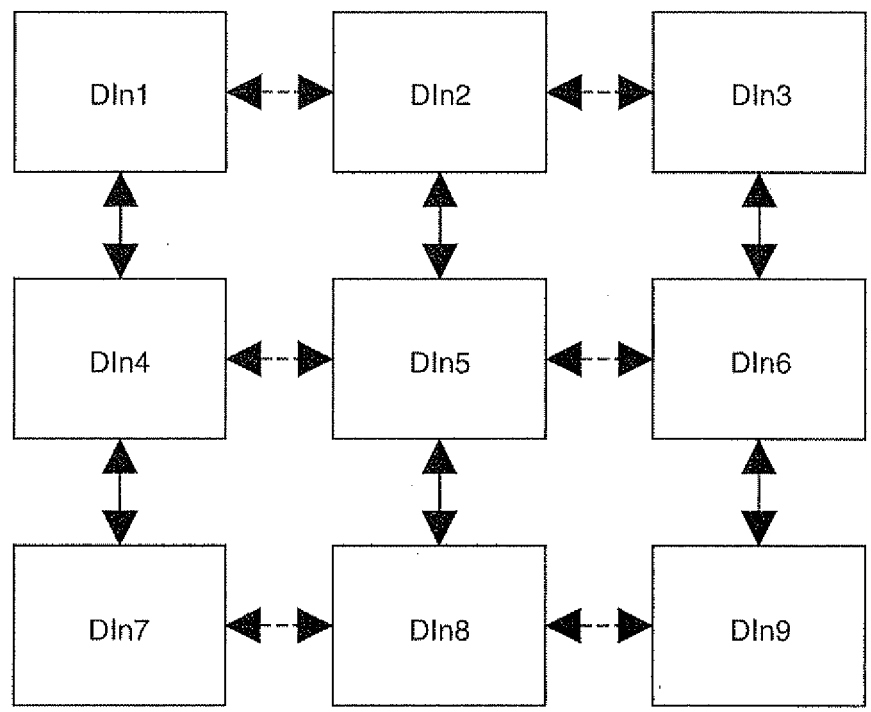
FIG. 6 is an explanatory diagram illustrating exchange paths of peripheral pixel data of image blocks.

Next, paths via which the image processing sections exchange peripheral pixel data will be described. FIG. 6 is an explanatory diagram schematically illustrating exchange paths of peripheral pixel data of the image blocks DIn. Actually, the data exchange parts of the image processing sections are connected to one another to exchange peripheral pixel data. For facilitating the understanding, however, the exchange paths of peripheral pixel data will be schematically described using the image blocks DIn1 to 9 which the respective image processing sections take charge of processing. Double-headed arrows shown in FIG. 6 each indicate the exchange path of peripheral pixel data between the image processing sections, and bidirectional data exchange is possible with one data exchange. In the embodiment, exchange of peripheral pixel data is performed at two timings. In FIG. 6, exchange paths used in the first data exchange are indicated by solid double-headed arrows, while exchange paths used in the second data exchange are indicated by dashed double-headed arrows.

As shown in FIG. 6, the image block DIn5 (actually the fifth image processing section 35), for example, is connected to the data exchange parts of the image processing sections which take charge of processing the vertically and horizontally adjacent image blocks DIn2, DIn4, DIn6, and DIn8 as the positional relationship of the image blocks DIn in the image data DIn0. The image block DIn5 performs peripheral pixel data exchange only with those image processing sections. Similarly, as for the other image processing sections, the image block corresponding to each of the other image processing sections is connected only to image processing sections corresponding to vertically and horizontally adjacent image blocks as the positional relationship of the image blocks, and performs peripheral pixel data exchange. Accordingly, the data exchange part of DIn5 (the fifth image processing section 35), for example, is connected with four communication lines; DIn1 is connected with two communication lines for data exchange; and DIn2 is connected with three communication lines for data exchange. In the embodiment, any of the data exchange parts of the image processing sections 31 to 39 includes four data exchange processing devices, and a communication path for peripheral pixel data exchange is configured by connecting the communication line to the data exchange processing device according to the required number of communication paths shown in FIG. 6.

Figure 7:
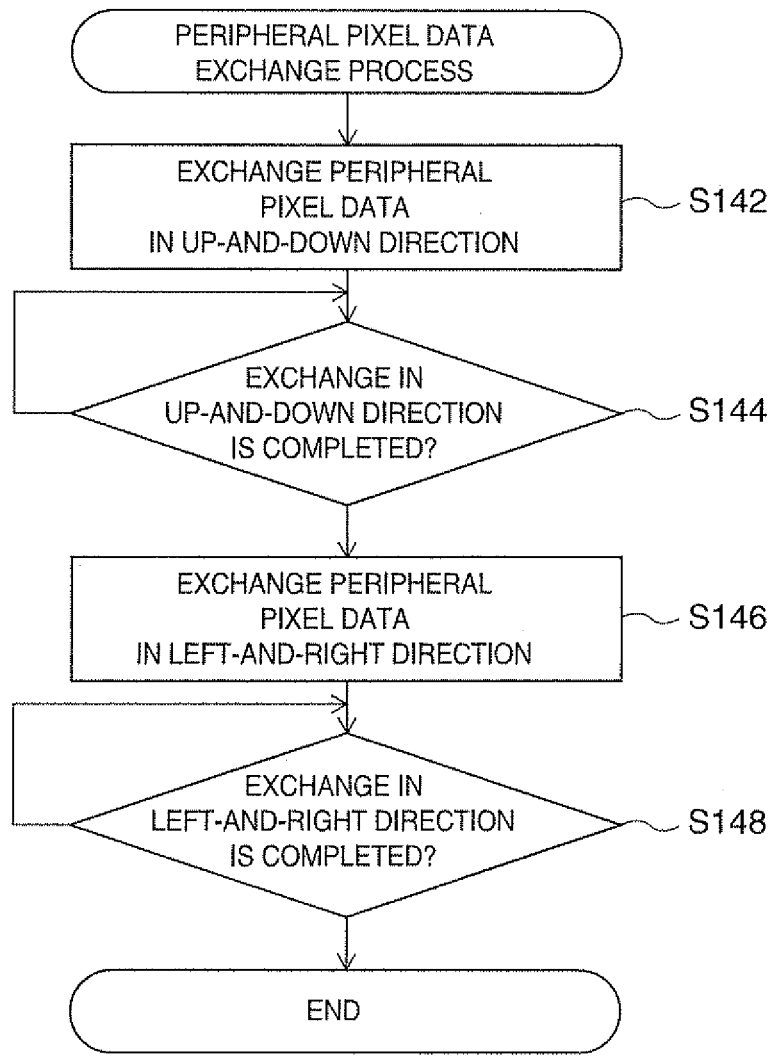
FIG. 7 is a flowchart illustrating the flow of a peripheral pixel data exchange process.
Figure 8A:
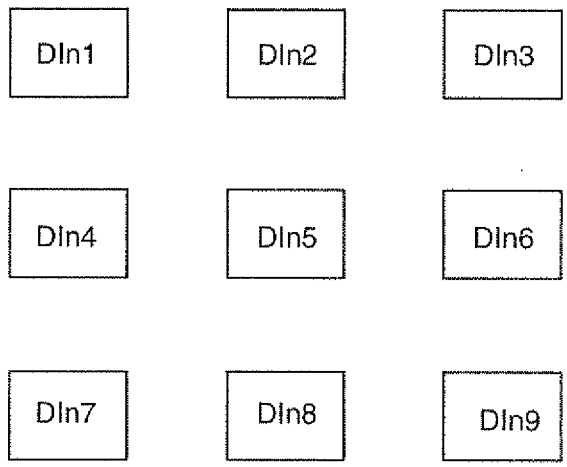
FIGS. 8A to 8D are explanatory diagrams illustrating exchange of peripheral pixel data.
Figure 8B:
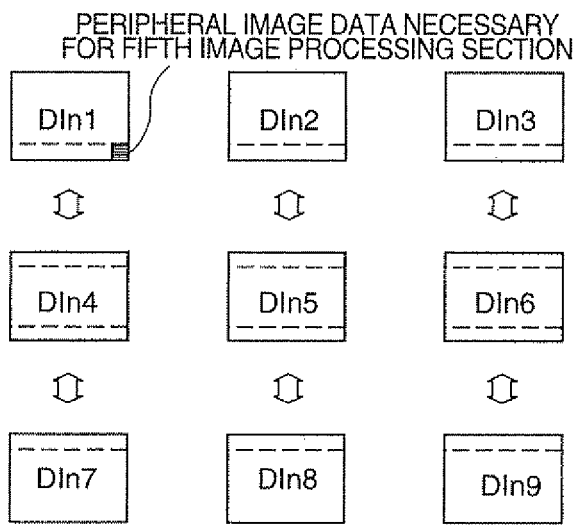

Next, the flow of the peripheral pixel data exchange process performed among the image processing sections will be described. FIG. 7 is a flowchart illustrating the flow of the peripheral pixel data exchange process. The peripheral pixel data exchange process is performed as a subroutine (FIG. 4: Step S140) in image processing (refer to FIG. 4) in the image processing apparatus 1. When the peripheral pixel data exchange process starts, exchange of peripheral pixel data is first performed between image processing sections which take charge of image processing of the image blocks DIn adjacent to each other in the up-and-down direction as the positional relationship of the image blocks DIn (Step S142). FIGS. 8A to 8D are explanatory diagrams showing exchange of peripheral pixel data. FIG. 8A shows a state where the image blocks DIn1 to DIn9 are stored in the respective image processing sections. FIG. 8B is an explanatory diagram showing a state where the exchange of peripheral pixel data is performed between the image processing sections adjacent to each other in the up-and-down direction as the positional relationship of the image blocks DIn described in Step S142. Each of portions surrounded by dashed lines in FIG. 8B is peripheral pixel data exchanged between the image processing sections which take charge of image processing of the image blocks DIn vertically adjacent to each other. As shown in FIG. 8B, the second image processing section 32, for example, which takes charge of image processing of the image block DIn2 exchanges peripheral pixel data with the fifth image processing section 35 which takes charge of the image block DIn5 adjacent thereto in the down direction; and the fifth image processing section 35 which takes charge of image processing of the image block DIn5 exchanges peripheral pixel data with the second image processing section 32 and the eighth image processing section 38 which respectively take charge of the image block DIn2 adjacent thereto in the up direction and the image block DIn8 adjacent thereto in the down direction.

At this time, the image block DIn1, for example, transmits to DIn4 peripheral image data necessary for the image block DIn4 to perform image processing, and simultaneously transmits to the image block DIn4 peripheral pixel data (a horizontally hatched portion in FIG. 8B) included in the image block DIn1, among peripheral pixel data necessary for the image block DIn5 to perform image processing. When acquiring those peripheral pixel data, the data exchange part 341 of the fourth image processing section 34 corresponding to the image block DIn4 temporarily stores those data in the frame memory 344 included in the fourth image processing section. In this case, among the peripheral pixel data transmitted from the image block DIn1 to the image block DIn4, the peripheral pixel data necessary for the image block DIn5 to perform processing is included in the peripheral pixel data necessary for the image block DIn4 to perform processing. That is, although these two peripheral pixel data have been described as different data for the convenience of description, the image block DIn1 actually transmits to the image block DIn4 peripheral pixel data necessary for the image block DIn4 to perform processing.

Figure 8C:
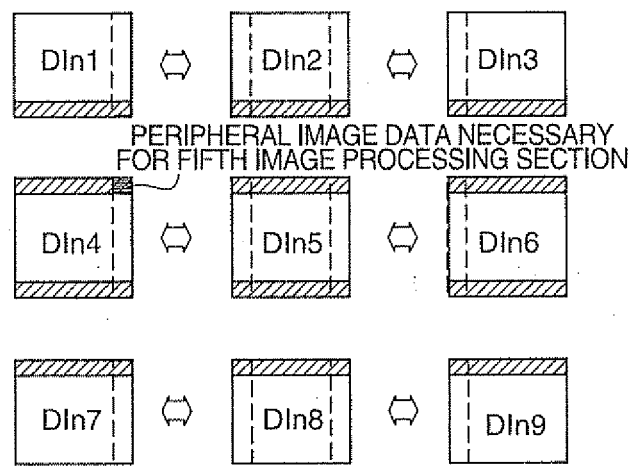

When each of the image processing sections completes the exchange of peripheral pixel data in the up-and-down direction, each of the data exchange parts notifies the timing instructing section 60 of the fact. The timing instructing section 60 analyzes the exchange status of peripheral pixel data in each of the data exchange parts. When the timing instructing section 60 determines that the exchange of peripheral pixel data is finished in all the image processing sections (Step S144: Yes), exchange of peripheral pixel data is subsequently performed between the image processing sections which take charge of image processing of the image blocks DIn adjacent to each other in the left-and-right direction as the positional relationship of the image blocks DIn (Step S146). FIG. 8C is an explanatory diagram showing a state where the exchange of peripheral pixel data is performed between the image processing sections which take charge of image processing of the image blocks DIn adjacent to each other in the left-and-right direction. Each of diagonally hatched portions in FIG. 8C is the peripheral pixel data acquired by each of the image blocks DIn by performing the exchange of peripheral pixel data between the image blocks adjacent in the up-and-down direction as described with reference to FIG. 8B. Each of portions surrounded by dashed lines in the image blocks DIn in FIG. 8C is peripheral pixel data to be exchanged between the image processing sections which take charge of image processing of the image blocks DIn adjacent to each other in the left-and-right direction. As shown in FIG. 8C, the image block DIn4, for example, exchanges peripheral pixel data with the image block DIn5 adjacent thereto in the right direction; and the image block DIn5 exchanges peripheral pixel data with the image block DIn4 and the image block DIn6 adjacent thereto in the left-and-right direction.

Figure 8D:
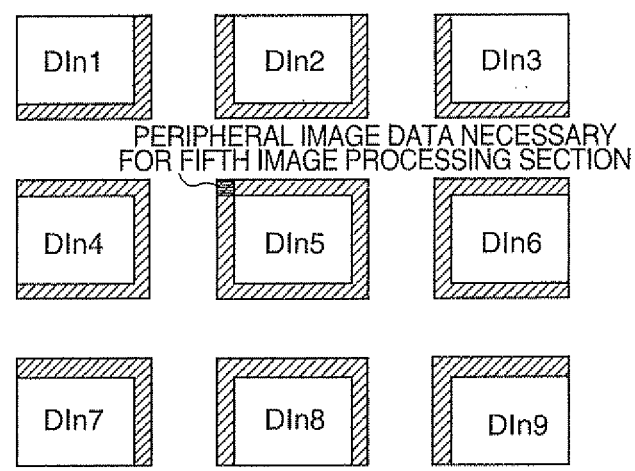

At this time, the image block DIn4 transmits the peripheral pixel data necessary for the image block DIn5 to perform processing and included in the image block DIn4, and simultaneously transmits the peripheral pixel data (refer to FIG. 8C) necessary for the image block DIn5 (the fifth image processing section 35) to perform processing, among the peripheral pixel data which the image block DIn4 acquired from the image block DIn1 in Step S142. That is, the image block DIn4 (the fourth image processing section 34) brokers the peripheral pixel data transmitted from the image block DIn1 (the first image processing section 31) to the image block DIn5 (the fifth image processing section 35). In other words, the image block DIn4 (the fourth image processing section 34) brokers at least part of data of pixels treated as peripheral pixels by the image block DIn5 (the fifth image processing section 35) from the image block DIn1 (the first image processing section 31) to the image block DIn5 (the fifth image processing section 35). When noting that the fourth image processing section 34 brokers the peripheral pixel data transmitted from the first image processing section 31 to the fifth image processing section 35, the fifth image processing section 35 corresponds to the "first image processing unit which acquires, when performing the image processing on a first partial image, at least data of pixels in a region adjacent to the first partial image, among pixels composing other partial images adjacent to the first partial image, to use the data for the image processing as the data of the peripheral pixels" set forth in the claims; and the fourth image processing section 34 corresponds to the "second image processing unit which performs the image processing on a second partial image different from the first partial image and brokers at least part of data of pixels treated as the peripheral pixels by the first image processing unit from an image processing unit which processes a partial image adjacent to the partial image treated by the first image processing unit to the first image processing unit" set forth in the claims. Between the other image processing sections, exchange of peripheral pixel data is performed by the same method. For example, the peripheral pixel data necessary for the image block DIn1 to perform processing and included in the image block DIn5 is transmitted to the image block DIn2 by the process in Step S142, and transmitted from the image block DIn2 to the image block DIn1 by the process in Step S146. In this manner, when each of the image processing sections completes the exchange of peripheral pixel data in the left-and-right direction, each of the data exchange parts notifies the timing instructing section 60 of the fact. The timing instructing section 60 analyzes the exchange status of peripheral pixel data in each of the data exchange parts. When the timing instructing section 60 determines that the exchange of peripheral pixel data is finished in all the image processing sections (Step S148: Yes), the peripheral pixel data exchange process is finished. FIG. 8D is an explanatory diagram showing the peripheral pixel data exchanged by the peripheral pixel data exchange process described with reference to FIGS. 8B and 8C. Each of diagonally hatched portions is peripheral pixel data acquired by each of the image blocks DIn through the peripheral pixel data exchange process. By exchanging peripheral pixel data in this manner, peripheral pixel data necessary for each of the image processing sections to perform image processing can be exchanged.

As described above, by using the method for exchanging peripheral pixel data in the first embodiment, peripheral pixel data necessary for the image processing sections to perform image processing can be exchanged by exchanging peripheral pixel data in the up-and-down direction (FIG. 7: Step S142) and in the left-and-right direction (FIG. 7: Step S146), i.e., twice in total, and therefore, the exchange of peripheral pixel data can be performed at high speed. As is apparent from FIG. 6, each of the image processing sections does not need to be connected to all the image processing sections, but it suffices that each of the image processing sections is connected to the image processing sections which take charge of image processing of the vertically and horizontally adjacent image blocks DIn as the positional relationship of the image blocks DIn. That is, it suffices that each image processing section is connected to a maximum of four image processing sections. Accordingly, compared to the case where each of the image processing sections is connected to all adjacent image processing sections with respective lines for peripheral pixel data exchange and directly communicates with each of them to exchange peripheral pixel data, it is possible to reduce the numbers of transceivers, wirings, pins of devices, and the like in view of the structure of the image processing apparatus. As the correspondence relationship between the embodiment and the claims, the image blocks DIn1 to 9 correspond to the "partial images" set forth in the claims; the image processing sections correspond to the "image processing units" set forth in the claims; and the image synthesizing section 40 corresponds to the "image output unit" set forth in the claims.

In the first embodiment, an example in which the image data DIn0 is divided into 3×3 has been described. However, even when the image data is divided into a larger number of parts, for example, 4×4, 10×10, or 16×9, the same advantages as those of the first embodiment can be obtained. That is, if each of the image processing sections which take charge of image processing of the image blocks DIn is connected to the image processing sections which take charge of image processing of the vertically and horizontally adjacent image blocks DIn as the positional relationship of the image blocks DIn, peripheral pixel data necessary for the image processing sections to perform image processing can be exchanged by exchanging peripheral pixel data in the up-and-down direction and in the left-and-right direction, i.e., twice in total by connecting each image processing section to a maximum of four image processing sections. Therefore, exchange of peripheral pixel data can be performed at high speed.

In the embodiment, there are the image processing section which brokers peripheral pixel data necessary for other image processing sections to perform processing and the image processing section which does not broker the peripheral pixel data, among the plurality of image processing sections. However, all the image processing sections may have the function of brokering to perform the brokering process as necessary according to the arrangement relationship of the image block DIn which the image processing section takes charge of processing in the image data DIn0. In this case, it suffices that the plurality of image processing sections includes at least the "first image processing unit which acquires, when performing the image processing on a first partial image, at least data of pixels in a region adjacent to the first partial image, among pixels composing other partial images adjacent to the first partial image, to use the data for the image processing as the data of the peripheral pixels" and the "second image processing unit which performs the image processing on a second partial image different from the first partial image and brokers at least part of data of pixels treated as the peripheral pixels by the first image processing unit from an image processing unit which processes a partial image adjacent to the partial image treated by the first image processing unit to the first image processing unit".

B. Second Embodiment

Figure 9A:
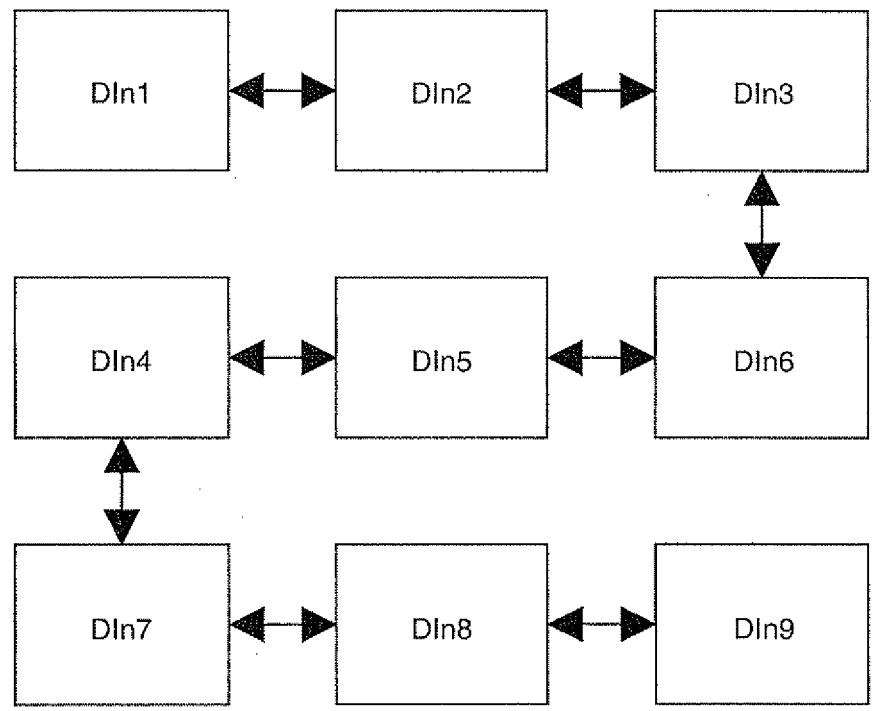
FIGS. 9A and 9B are explanatory diagrams showing one example of exchange paths of peripheral pixel data in a second embodiment.
Figure 9B:
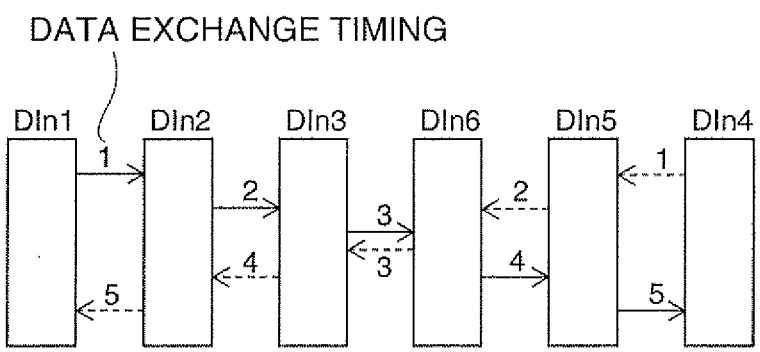

Next, a second embodiment will be described. The difference between the first embodiment and the second embodiment resides in exchange paths of peripheral pixel data of the image blocks DIn. With the difference, the flow of exchange of peripheral pixel data is also different between the first embodiment and the second embodiment. The exchange paths of peripheral pixel data in the second embodiment are configured so as to connect the image blocks DIn1 to 9 with one path and without passing through the same path twice in the positional relationship of the image blocks DIn. In other words, the paths are configured through the image blocks DIn1 to 9 in a so-called "single-stroke" manner (an Eulerian path (in the case of a closed path)" or a "traversable figure (in the case where a starting point and an end point are different))". FIGS. 9A and 9B show one example. FIG. 9A is an explanatory diagram showing one example of exchange path of peripheral pixel data of the image blocks DIn in the second embodiment. The image blocks (actually the image processing sections) are connected to one another with the exchange paths. Each of the exchange paths is a path via which the image blocks (actually the image processing sections) directly acquire peripheral pixel data from each other. The exchange paths correspond to the "data acquiring paths" set forth in the claims. As shown in FIG. 9A, the exchange paths of peripheral pixel are configured so as to connect the image blocks DIn1 to with one path and without passing through the same image block twice. The image processing sections exchange peripheral pixel data using such exchange paths. Double-headed arrows in FIG. 9A each indicate the exchange path of peripheral pixel data between the image processing sections, and bidirectional data exchange is possible by a single data exchange. A single stroke is possible under a condition where "the number of vertexes from which an odd number of lines emanates is zero (a closed path) or two (a starting point and an end point are different)". When this condition is put into the embodiment, such a single-stroke path can be configured when "the number of image processing sections to which an odd number of peripheral pixel data exchange paths is connected is zero or two". In other words, the single-stroke path can be configured when "among the data exchange parts, the number of data exchange parts which directly perform data exchange with an odd number of other data exchange parts is zero or two". In this manner, the path configured of the image processing units and the data acquiring paths and passing through all the image processing units once is formed. The series of exchange paths of peripheral pixel data enabling such a single stroke corresponds to the "data communication path" set forth in the claims.

Next, a method for exchanging peripheral pixel data will be described. For example, when the peripheral pixel data (refer to FIG. 5) necessary for image processing of the image block DIn5 and included in the image block DIn1 is exchanged, the peripheral pixel data is transmitted to DIn5 through the exchange path of DIn1→DIn2→DIn3→DIn6→DIn5. Moreover, bidirectional data exchange is possible by single data exchange as described above. For example, DIn1 and DIn4 (or DIn6 and DIn9) between which the longest exchange path of peripheral pixel data exits can exchange peripheral pixel data by performing data exchange at five timings.

FIG. 9B is an explanatory diagram illustrating timings of data exchange necessary for exchanging data between DIn1 and DIn4 and the directions of the exchange. For the convenience of description, the exchange paths of peripheral pixel data from DIn1 to DIn4 are linearly expressed. Solid arrows show a state where peripheral pixel data necessary for DIn4 and included in DIn1 is transmitted from DIn1 through DIn2, DIn3, DIn6, and DIn5 to DIn4 in this order. On the other hand, dashed arrows show a state where peripheral pixel data necessary for DIn1 and included in DIn4 is transmitted from DIn4 through DIn5, DIn6, DIn3, and DIn2 to DIn1 in this order.

The numbers above the arrows each indicate the timing at which data exchange is performed. That is, at the first timing of data exchange, data exchange of DIn1→DIn2 and data exchange of DIn4→DIn5 are performed. At the second timing of data exchange, data exchange of DIn2→DIn3 and data exchange of DIn5→DIn6 are performed. By performing the exchange of peripheral pixel data in this manner, DIn1 and DIn4 can exchange peripheral pixel data at five timings of data exchange. During the five timings of data exchange, DIn2 and DIn5, or DIn3 and DIn5, for example, can exchange peripheral pixel data through another or other image blocks DIn. The image blocks which directly exchange peripheral pixel data, such as DIn1 and DIn2, or DIn5 and DIn4, can of course directly exchange peripheral pixel data during the five timings of data exchange.

Similarly, also peripheral pixel data necessary for each of the other image processing sections is transmitted to the image processing section which needs the peripheral image data via the exchange path(s) shown in FIG. 9A through another or other image processing sections. The exchange path shown in FIG. 9A corresponds to the "case where a starting point and an end point are different" in terms of a single stroke. In this case, the image processing sections bidirectionally exchange peripheral pixel data to acquire peripheral pixel data necessary for the image processing sections. The exchange path can also be configured as the "closed path" in terms of a single stroke. In this case, the exchange path has a loop shape. Therefore, each of the image processing sections transmits peripheral pixel data only in one direction on the exchange path, and when peripheral pixel data necessary for the image processing section to perform processing passes through the image processing section, the image processing section may acquire (or refer to) the peripheral pixel data. A specific path in that case will be described later in modified examples.

As described above, by using the method for exchanging peripheral pixel data in the second embodiment, each of the image processing sections does not need to be connected to all the image processing sections, but it suffices that each of the image processing sections is connected to one or two image processing sections. Accordingly, compared to the first embodiment, it is possible to further reduce the numbers of transceivers, wirings, pins of devices, and the like in view of the structure of the image processing apparatus.

C. MODIFIED EXAMPLES

The invention is not limited to the above embodiments but can be implemented in various modes in a range not departing from the gist thereof. For example, the following modifications are possible.

C1 First Modified Example

In the embodiments, the image data DIn0 is divided into 3×3. However, the same advantages can be obtained even when the image data DIn0 is divided into M×N (M and N are each a positive integer of 2 or more) such as 4×4 or 4×3. When the division number is increased, the processing speed of image processing becomes faster compared to the embodiments because the number of pixels which each of the image processing sections processes is reduced.

C2 Second Modified Example

In the first embodiment, the peripheral pixel data exchange process is first performed in the up-and-down direction (vertical direction) and then performed in the left-and-right direction (horizontal direction). As a second modified example, however, the peripheral pixel data exchange process may be first performed in the left-and-right direction (horizontal direction) and then performed in the up-and-down direction (vertical direction). Even when the peripheral pixel data exchange process is performed in this manner, the same advantages as those of the first embodiment can be obtained.

C3 Third Modified Example

Figure 10A:
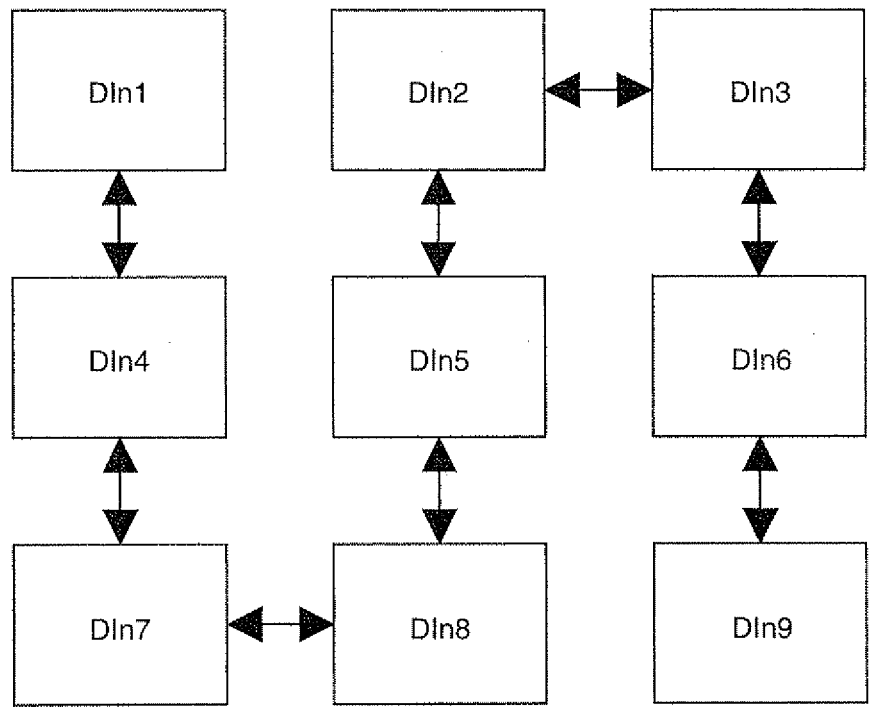
FIGS. 10A and 10B are explanatory diagrams each showing a specific example of a third modified example.
Figure 10B:
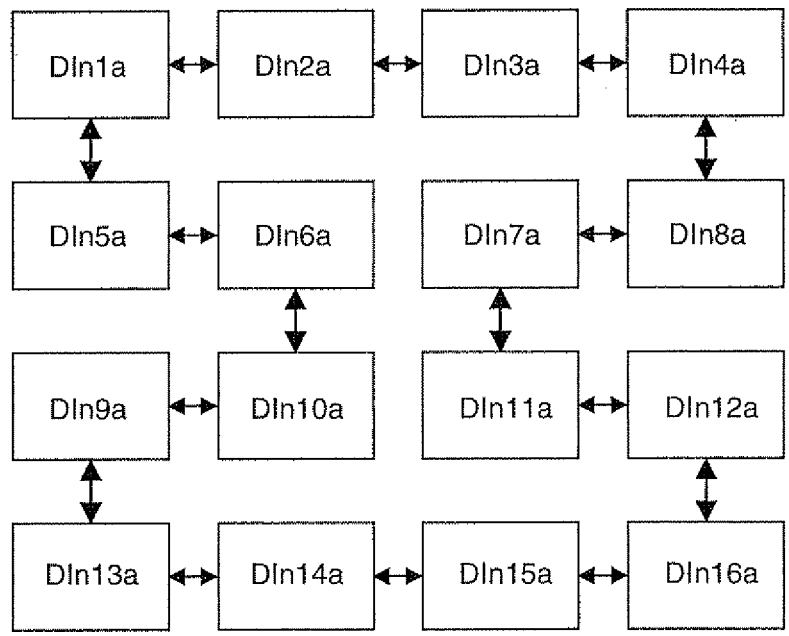

In the second embodiment, peripheral pixel data is exchanged via the exchange path of peripheral pixel data shown in FIGS. 9A and 9B. However, this is not restrictive. DIn0 can be divided into 3×3 or other division numbers. For example, exchange paths shown in FIGS. 10A and 10B can be configured to exchange peripheral pixel data. The exchange paths shown in FIG. 10A and FIG. 10B are configured so as to connect the image blocks DIn with one path and without passing through the same path twice. FIG. 10B shows the path configuration of the "closed path" described above. When peripheral pixel data is exchanged via the exchange path configured in this manner, it suffices for each of the data exchange parts to transmit peripheral pixel data only in one direction on the path as described above. Even with such a path configuration, the same advantages as those of the second embodiment can be obtained.

C4 Fourth Modified Example

In the embodiment, after the partial image data in each of the image processing sections is accumulated, the timing instructing section outputs the instruction of data exchange start to the image processing sections. In a fourth modified example, however, the timing instructing section 60 analyzes the accumulation status of image data in each of the image processing sections 31 to 39 and instructs the processing sections which can exchange data, among the first to ninth image processing sections 31 to 39, to start data exchange. When data is exchanged in this manner, data exchange can be performed at higher speed compared to the embodiment.

C5 Fifth Modified Example

Figure 11:
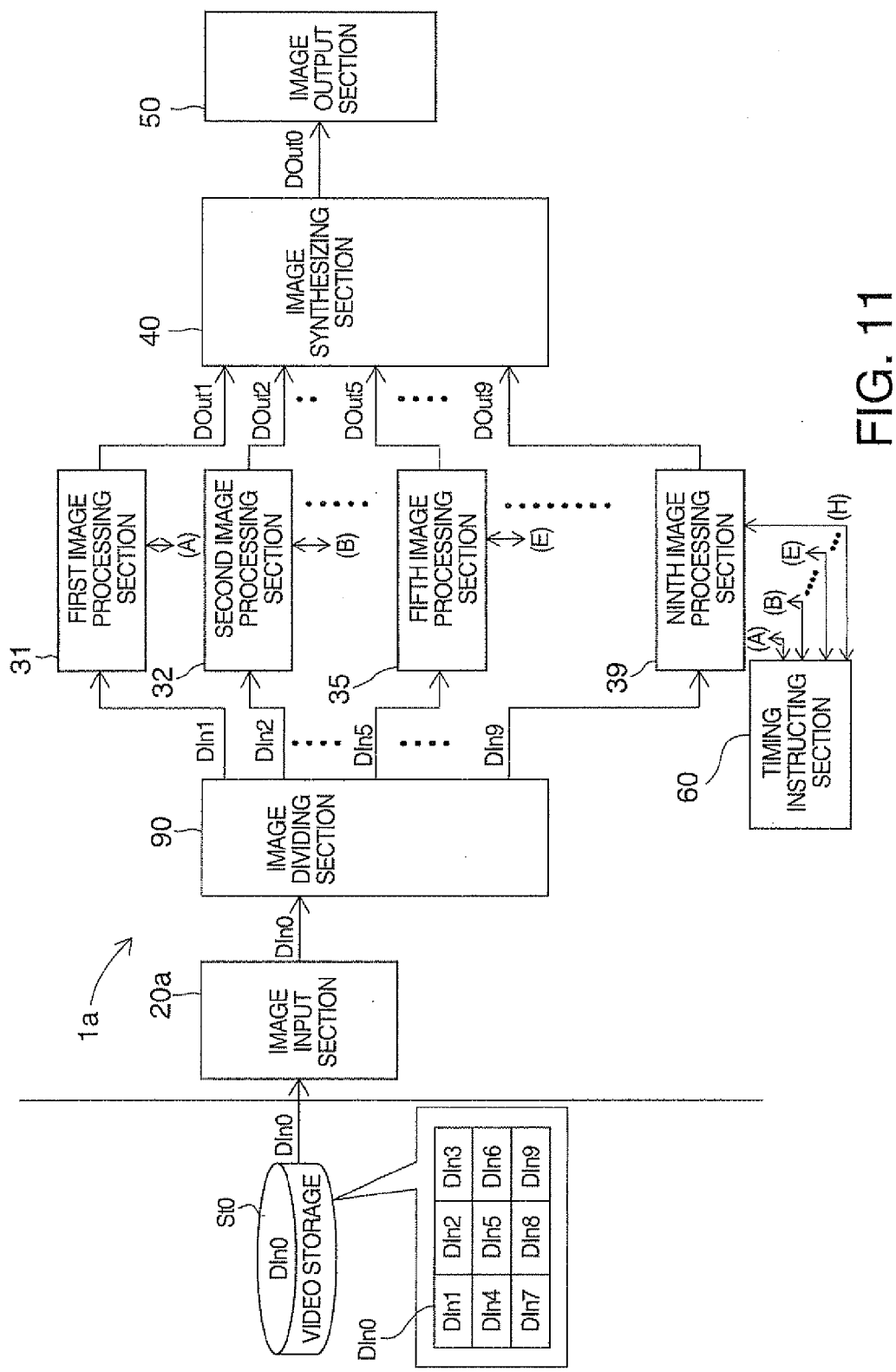
FIG. 11 is an explanatory diagram showing a specific example of a fifth modified example.

In the embodiment, the image blocks DIn1 to 9 are input from the video storages St1 to St9 to the projector via the image input sections 21 to 29. In a fifth modified example, however, the image data DIn0 is input to the projector, and the image data DIn0 is divided into the image blocks DIn1 to DIn9 in an image processing apparatus 1*a*. FIG. 11 is an explanatory diagram illustrating a configuration of the image processing apparatus 1*a* in the fifth modified example. Functional blocks having the same function as those of the first embodiment are denoted by the same reference numerals and signs. As shown in FIG. 11, the image data DIn0 is input from a video storage St0 storing the image data DIn0 to an image input section 20*a*, and an image dividing section 90 included in the image processing apparatus 1*a* divides the image data DIn0 into the image blocks DIn1 to DIn9 and transmits the image blocks to the respective image processing sections 31 to 39. Subsequent processes are the same as those in the first embodiment. Even with this configuration, the same advantages as those of the embodiment can be obtained.

C6 Sixth Modified Example

In the embodiment, the data exchange part includes the plurality of data exchange processing devices each of which exchanges peripheral pixel data with another image processing section, thereby exchanging data with the other plurality of image processing sections. As a sixth modified example, however, changeover switches SW each of which switches the directions of data exchange are provided, so that the number of data exchange processing devices may be reduced more than the embodiment.

Figure 12:
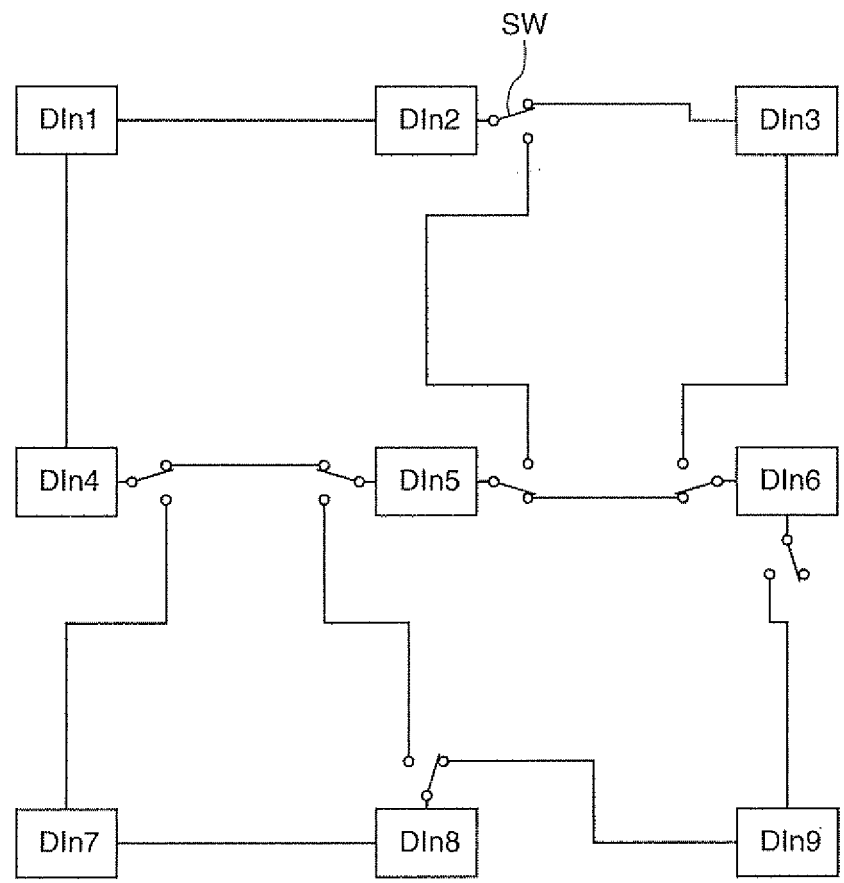
FIG. 12 is an explanatory diagram showing a specific example of a sixth modified example.

FIG. 12 is an explanatory diagram illustrating a specific example of the sixth modified example. In the image processing apparatus as shown in FIG. 12, each of the image processing sections is connected to the vertically or horizontally adjacent image processing sections, similarly to the first embodiment. As a feature of the sixth modified example, the changeover switches SW are provided on connection paths as necessary. In FIG. 12, the changeover switch SW is provided outside the image processing section. However, the changeover switch SW may be provided inside the image processing section. In the specific example of FIG. 12, when peripheral pixel data is exchanged between the image processing sections, the changeover switch SW is switched as necessary at the timing of data exchange, so that communication with a maximum of four image processing sections is possible. Therefore, data exchange substantially the same as the first embodiment is possible. With such a configuration, the image processing section does not need to include four data exchange processing devices, and therefore, the number of data exchange processing devices can be reduced.

Moreover, the sixth modified example may be configured such that the connection paths among the image processing sections have the so-called single-stroke configuration, that the image processing section which performs data exchange with two or more image processing sections includes the changeover switches SW, and that the changeover switches SW are switched at the timing of data exchange as necessary. By doing this, the number of data exchange processing devices can be reduced compared to the second embodiment.

The entire disclosure of Japanese Patent Application No. 2009-264631, filed Nov. 20, 2009 is expressly incorporated by reference herein.

What is claimed is:

1. An image processing apparatus which processes image data representing an image composed of a plurality of pixels comprising:
    a plurality of image processing units each of which is disposed so as to correspond to each of partial images obtained by dividing a display image corresponding to the image data and processes data of each of pixels composing the partial image with reference to data of peripheral pixels of the pixel, image data corresponding to the partial image is input to the plurality of image processing units:
    an image portion corresponding to each image processing section being connected only to image processing sections corresponding to vertically and horizontally adjacent image portions; and
    an image output unit which outputs display image data using data of pixels on which the image processing has been performed by the image processing units, wherein
    the plurality of image processing units includes at least
        a first image processing unit which acquires, when performing the image processing on a first partial image, at least data of pixels in a region adjacent to the first partial image, among pixels composing other partial images adjacent to the first partial image, to use the data for the image processing as the data of the peripheral pixels, and
        a second image processing unit which performs the image processing on a second partial image different from the first partial image and brokers at least part of data of pixels treated as the peripheral pixels by the first image processing unit from an image processing unit which processes a partial image adjacent to the partial image treated by the first image processing unit to the first image processing unit.

2. The image processing apparatus according to claim 1, wherein
    the second image processing unit brokers, together with acquisition of peripheral pixel data necessary for the second image processing unit for the reference, the peripheral pixel data necessary for the first image processing unit for the reference.

3. The image processing apparatus according to claim 2, wherein
    each of the partial images is an image obtained by two-dimensionally dividing the display image corresponding to the image data in a horizontal direction and a vertical direction, and
    when the first image processing unit refers to peripheral pixel data of a diagonally adjacent partial image adjacent to the first partial image in a diagonal direction,
        the second partial image is positioned adjacent to one of the first partial image and the diagonally adjacent partial image in the horizontal direction and the other in the vertical direction, and
        the second image processing unit brokers the peripheral pixel data of the diagonally adjacent partial image necessary for the first image processing unit for the reference.

4. The image processing apparatus according to claim 3, wherein
    the image processing units exchange the peripheral pixel data at two time-divided timings,
    at the first timing of the two timings, each of the image processing units exchanges the peripheral pixel data with the image processing unit adjacent thereto in one of the horizontal direction and the vertical direction, and
    at the second timing of the two timings, each of the image processing units exchanges the peripheral pixel data with the image processing unit adjacent thereto in the other of the horizontal direction and the vertical direction.

5. The image processing apparatus according to claim 1, wherein
    the plurality of image processing units include zero or two image processing units each of which acquires, from an odd number of image processing units of a plurality of other image processing units respectively corresponding to partial images adjacent to a corresponding partial image, part of data of pixels in a region adjacent to the corresponding partial image as the peripheral pixel data for the reference, and
    a data communication path configured of the image processing units and data acquiring paths each of which is a path via which the image processing units directly acquires the peripheral pixel data from each other and passing through all the image processing units once is formed by connecting the image processing units to one another with the data acquiring paths.

6. The image processing apparatus according to claim 1, further comprising:
    an image data input section which inputs the image data; and
    an image dividing section which two-dimensionally divides the display image corresponding to the image data to obtain the plurality of partial images and inputs each of the partial images to each of the image processing units.

7. The image processing apparatus according to claim 1, further comprising a timing control section which controls a plurality of time-divided timings at which the image processing units exchange the peripheral pixel data.

8. An image processing method for processing image data representing an image composed of a plurality of pixels by using a plurality of image processing units each of which is disposed so as to correspond to each of partial images obtained by dividing a display image corresponding to the image data and processes data of each of pixels composing the partial image with reference to data of peripheral pixels of the pixel, image data corresponding to the partial image is input to the plurality of image processing units, an image portion corresponding to each image processing section being connected only to image processing sections corresponding to vertically and horizontally adjacent image portions, comprising:

- by using a first image processing unit of the plurality of image processing units, acquiring, when performing the image processing on a first partial image, at least data of pixels in a region adjacent to the first partial image, among pixels composing other partial images adjacent to the first partial image, to use the data for the image processing as the data of the peripheral pixels;
- by using a second image processing unit, performing the image processing on a second partial image different from the first partial image and brokering at least part of data of pixels treated as the peripheral pixels by the first image processing unit from an image processing unit which processes a partial image adjacent to the partial image treated by the first image processing unit to the first image processing unit; and
- outputting display image data using data of pixels on which the image processing has been performed by the plurality of image processing units.

* * * * *